Patented Dec. 20, 1938

2,140,835

UNITED STATES PATENT OFFICE 2,140,835

COATED FIBROUS SHEET AND WEB MATERIAL AND PROCESS FOR MAKING SAME

Erich Gebauer-Fuelnegg, Evanston, Ill., and Eugene W. Moffett, Gary, Ind., assignors, by mesne assignments, to Marbo Patents Inc., a corporation of Delaware No Drawing. Application April 25, 1934, Serial No. 722,252. Renewed October 6, 1937

6 Claims. (Cl. 91—68)

This invention relates to coated fibrous sheet and web material for wrapping and other purposes where a moisture, water, grease and gas resisting material is required.

The difficulty with much of the coated sheet and web material previously proposed for this purpose has been that the coating cracks when the paper is bent or scored, and the material thus loses much of its efficiency as an impervious wrapper or container. In the present invention the fibrous base is coated with a thin layer of a compound of rubber formed by reacting rubber either partially or completely with a hydrogen halide by any suitable process.

It is therefore an object of this invention to provide a fibrous web or sheet base treated with a rubber hydrohalide.

It is a further object of this invention to provide a process for preparing a rubber hydrochloride coated or impregnated fibrous web or sheet material that is highly resistant to the penetration of moisture, water, grease or gases.

Other and further objects of this invention will be evident from the following specifications and the accompanying claims:

The rubber hydrohalide used in this process may be produced by the method disclosed in our application Serial No. 703,866. In this process, unvulcanized rubber, in sheet or comminuted form, is exposed to the action of a hydrogen halide, such as hydrogen chloride, either in gaseous form under pressure or in liquefied condition. When the reaction is partially or substantially complete the reaction product is isolated.

By stopping before the reaction is complete, a partially reacted product especially suitable for use in the present invention may readily be obtained.

It will be understood that other methods may also be used for making the rubber hydrohalide, such as passing hydrogen chloride through a solution of rubber in benzene, carbon tetrachloride or other volatile solvent.

The rubber hydrochloride preferably should not be entirely reacted with hydrogen chloride where flexibility is particularly important, but the reaction should be stopped at some intermediate point, say at a point where the chlorine content of the rubber is about 24% by weight. The exact percentage is not critical but it should be sufficiently low so that the rubber compound does not become brittle but retains sufficient stretchability that the film will not break when the fibrous base material is folded. When the chlorine content exceeds 24%, the rubber compound is likely to be insufficiently flexible and elastic. If the rubber is insufficiently reacted with hydrogen chloride, however, the product will be tacky and for that reason unsuitable for use. Any rubber sufficiently reacted to be non-tacky is usable. The exact minimum chlorine content which will result in a rubber hydrochloride which is non tacky at ordinary room temperature varies slightly according to the type of rubber hydrochloride. In general, rubber hydrochlorides having a chlorine content of about 28% and above are non tacky, and satisfactory for coating on paper to obtain a sheet usable for wrapping purposes, although the coating produced is not as flexible as that obtained by coating with rubber hydrochlorides having a chlorine content of 24% by weight. If a comparatively heavy paper or fiber board is to be coated, the film of rubber compound should be more flexible, and therefore have a low chlorine content, in order to avoid breaking of the coating when the paper is folded.

The rubber hydrochloride is dissolved in any suitable solvent such as carbon tetrachloride, benzene and its homologues, or ethylene dichloride, preferably to a concentration of 8 to 10%, and in general between 4 and 12% by weight.

A satisfactory coating composition can be made by the above procedure, but it is preferable to add a gum or resin to act as a bonding agent. Such substances cause a firmer adherence of the coating to the fibrous base and may be used in amounts up to 75% of the dry solids contained in the coating solution. The use of various gums or resins in this manner is also advantageous since the viscosity of the solution is somewhat reduced by them.

Various resins, gums, waxes and the like have been found to be satisfactory. These include the arochlors (chlorinated diphenyls), paraffin, chlorinated paraffin, coumar, resin, and dammar gum. Various antioxidants may also be added to preserve the rubber if desired.

The following formula of a satisfactory coating composition is not to be construed as a limitation on the invention since the proportions are not critical, but is to be understood as giving desirable proportions which have been found to be operative:

*Example*

| | Percentage by weight |
|---|---|
| Rubber hydrochloride | 30 to 75 |
| Chlorinated diphenyl | 70 to 25 |

The coating solution may comprise a solution of about 8 to 10% by weight of the above mixture in a suitable solvent.

This coating material may be used advantageously on a number of types of paper including grease proof papers such as parchment, glassine and other papers to give a semi-transparent coated sheet material. If transparency is desired, it is preferable to use a rubber hydrochloride prepared by treatment of rubber with liquid hydrogen chloride or by reaction between rubber in a solvent and gaseous hydrogen chloride under strictly anhydrous conditions, since these methods produce a rubber hydrochloride capable of forming a highly transparent film. The preparation of a rubber hydrochloride under anhydrous conditions is being made the subject of a separate application which will be copending herewith. Opaque papers made from chemical wood pulp and fibre boards may be coated with less transparent films of rubber hydrochloride. Many types of papers used as wrapping materials may be advantageously made moisture resistant by a coating of this composition.

The coating may be applied to one or both sides of the fibrous base material in a continuous manner, as by a fountain roll, doctor or the like, in a tower coater, or in a straight pass air floated type of coating machine. In general, the coating will be of a thickness less than 10% of the thickness of the base material when ordinary thicknesses of paper are used. Of course when thick materials such as cardboards are being coated the thickness of the coating in terms of percentage of the thickness of the sheet will be much less than 10%. In such cases it could be less than 1% of the thickness of the sheet.

This coating also has the great advantage of being heat sealing. By this is meant that when two sheets of the material are pressed together and heated, a secure bond between them is formed. This makes it possible to use paper which has been coated with this composition in wrapping machines in a similar manner to waxed paper. It is preferable to waxed paper, in fact, since when waxed paper is sealed in this manner the bond is much weaker than when the material disclosed herein is used.

Our coating has the advantages of being non-tacky at ordinary room temperatures and resistant to the passage of grease, gas, moisture, and water, thus making an ideal wrapping material for foodstuffs.

Coated fiber board, for instance, is admirably suited for making up into containers for food products, such as frozen foods, fats, butter, coffee and the like. Laminated material may also be prepared with our composition as the adhesive layer.

Where the term "rubber" is used herein and in the claims, it will be understood to mean rubber, caoutchouc, and rubber-like materials, either natural or synthetic in their origin, including balata, gutta percha and chicle.

We are aware that numerous details of the process may be varied through a wide range without departing from the principles of this invention, and we, therefore, do not purpose limiting the patent granted hereon otherwise than necessitated by the prior art.

We claim as our invention:

1. A transparent sheet material comprising a sheet of glassine paper having a coating thereon of a rubber hydrochloride and a resinous bonding agent of such character and in such amount that the transparency of the sheet material will be substantially undiminished and the rubber hydrochloride will adhere tenaciously to the glassine paper.

2. A transparent sheet material comprising a sheet of glassine paper having a heat sealable, transparent coating thereon composed essentially of a rubber hydrochloride and a chlorinated diphenyl.

3. Flexible, grease and moisture resistant sheet material suitable for wrapping purposes and the like, comprising a glassine sheet having firmly adhered thereto a thin grease and moisture resistant coating, composed essentially of a rubber hydrochloride having intimately admixed therewith a substance selected from the group consisting of resins, gum, and waxes, of such character and in such amount as to be compatible with rubber hydrochloride.

4. Flexible, grease and moisture resistant sheet material suitable for wrapping purposes and the like, comprising a glassine sheet having firmly adhered thereto a thin grease and moisture resistant coating, composed essentially of a rubber hydrochloride having intimately admixed therewith a chlorinated diphenyl.

5. Flexible, grease and moisture resistant sheet material suitable for wrapping purposes and the like, comprising a glassine sheet having firmly adhered thereto a thin grease and moisture resistant coating, composed essentially of a rubber hydrochloride having intimately admixed therewith paraffin wax in such amount as to be compatible with rubber hydrochloride.

6. Flexible, grease and moisture resistant sheet material suitable for wrapping purposes and the like, comprising a glassine sheet having firmly adhered thereto a thin grease and moisture resistant coating, composed essentially of a rubber hydrochloride having intimately admixed therewith a chlorinated paraffin wax.

ERICH GEBAUER-FUELNEGG.
EUGENE W. MOFFETT.